United States Patent
Pugh et al.

(10) Patent No.: US 9,268,155 B2
(45) Date of Patent: Feb. 23, 2016

(54) VARIABLE FOCUS ELECTROACTIVE OPHTHALMIC DEVICE

(71) Applicant: Johnson & Johnson Vision Care, Inc., Jacksonville, FL (US)

(72) Inventors: Randall Pugh, Jacksonville, FL (US); James Riall, St. Johns, FL (US); Daniel Otts, Fruit Cove, FL (US); Frederick Flitsch, New Windsor, NY (US); Adam Toner, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 40 days.

(21) Appl. No.: 13/928,531

(22) Filed: Jun. 27, 2013

(65) Prior Publication Data

US 2014/0002789 A1    Jan. 2, 2014

Related U.S. Application Data

(60) Provisional application No. 61/666,136, filed on Jun. 29, 2012.

(51) Int. Cl.
| | |
|---|---|
| *G02C 7/02* | (2006.01) |
| *G02B 3/12* | (2006.01) |
| *G02C 7/08* | (2006.01) |
| *G02B 3/14* | (2006.01) |
| *G02C 7/04* | (2006.01) |

(52) U.S. Cl.
CPC *G02C 7/085* (2013.01); *G02B 3/14* (2013.01); *G02C 7/04* (2013.01)

(58) Field of Classification Search
CPC ............. G02C 7/02; G02C 7/04; G02C 7/085
USPC ................. 351/159.34, 159.68; 359/665–667
See application file for complete search history.

(56) References Cited

U.S. PATENT DOCUMENTS

| | | | | |
|---|---|---|---|---|
| 7,311,398 | B2 * | 12/2007 | Kuiper et al. | ............ 351/159.04 |
| 2003/0060878 | A1 | 3/2003 | Shadduck | |

(Continued)

FOREIGN PATENT DOCUMENTS

| | | | |
|---|---|---|---|
| WO | WO 2005096029 A1 | 10/2005 | |
| WO | WO 2005096030 A1 | 10/2005 | |
| WO | WO 2010104606 A2 | 9/2010 | |

OTHER PUBLICATIONS

International Search Report for PCT US2013 048194 Date of Mailing Sep. 26, 2013.

*Primary Examiner* — Darryl J Collins

(57) ABSTRACT

A variable focus ophthalmic device is described. The device comprises a front curve optical portion of the variable focus ophthalmic device comprising a front curve top optical surface and a front curve bottom optical surface and a back curve optical portion of the variable focus ophthalmic device comprising a back curve top optical surface and a back curve bottom optical surface. A cavity is formed by the front curve bottom optical surface of the front curve optical portion of the variable focus ophthalmic device and the back curve top optical surface of the back curve portion of the variable focus ophthalmic device. A first fluid with a first index of refraction and a second fluid with a second index of refraction is provided, wherein the first index of refraction and the second index of refraction are different and the two fluids are immiscible. A dielectric film in contact with at least a portion of one or more of the first or second fluids and overlying an electrode capable of establishing an electric field is provided. One or more reservoir regions for containment of a volume of fluid equal or approximately equal to the volume of the first fluid and wherein the reservoir is in fluid connection with said formed cavity.

21 Claims, 9 Drawing Sheets

(56) References Cited

U.S. PATENT DOCUMENTS

| | | |
|---|---|---|
| 2004/0184158 A1 | 9/2004 | Shadduck |
| 2008/0239925 A1* | 10/2008 | Kuiper et al. ............ 369/112.02 |
| 2010/0079724 A1 | 4/2010 | Pugh |
| 2011/0149407 A1* | 6/2011 | Dharmatilleke et al. ..... 359/666 |
| 2011/0249234 A1* | 10/2011 | Duis et al. ................. 351/160 R |
| 2012/0075712 A1 | 3/2012 | Pugh |

\* cited by examiner

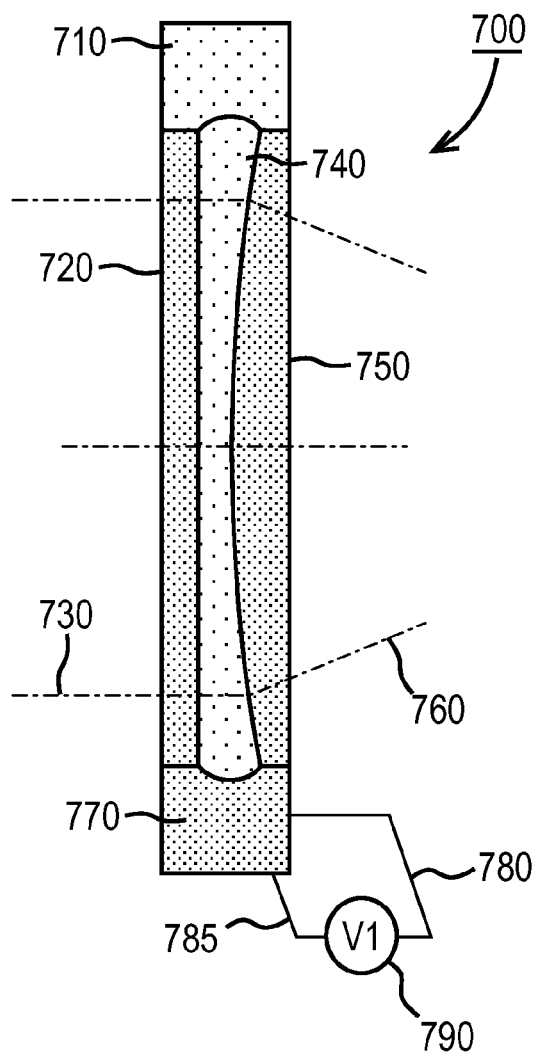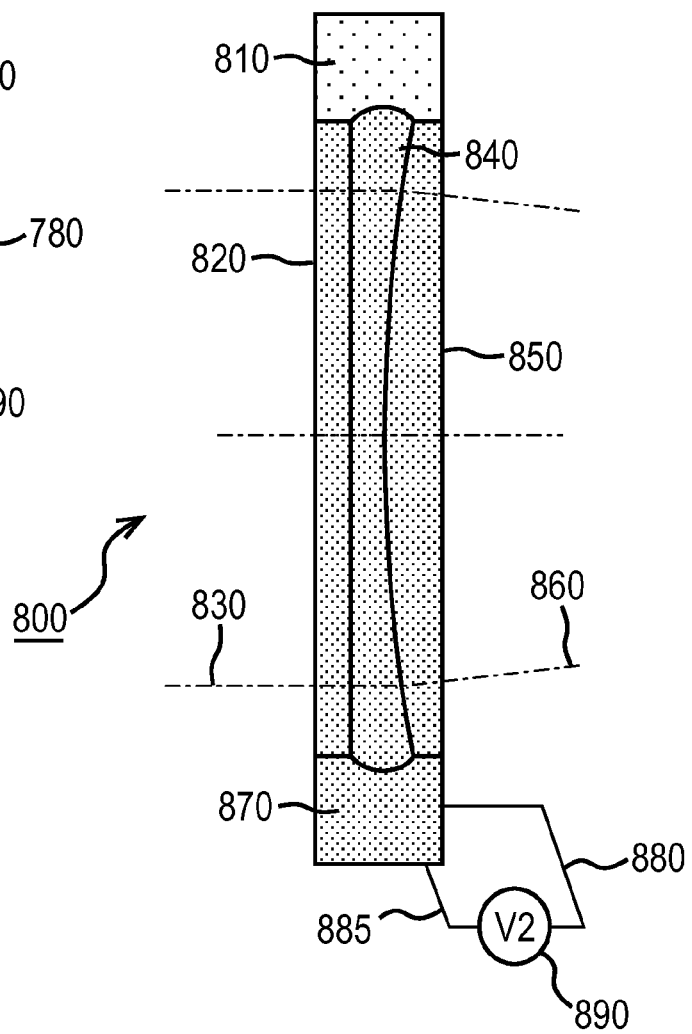

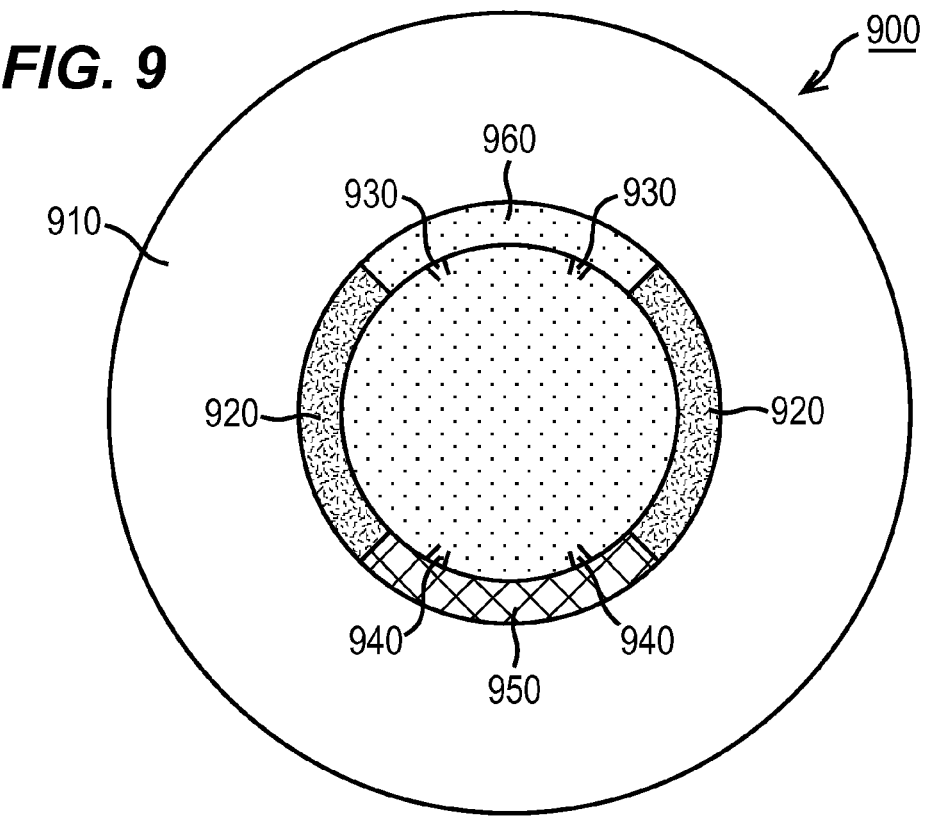
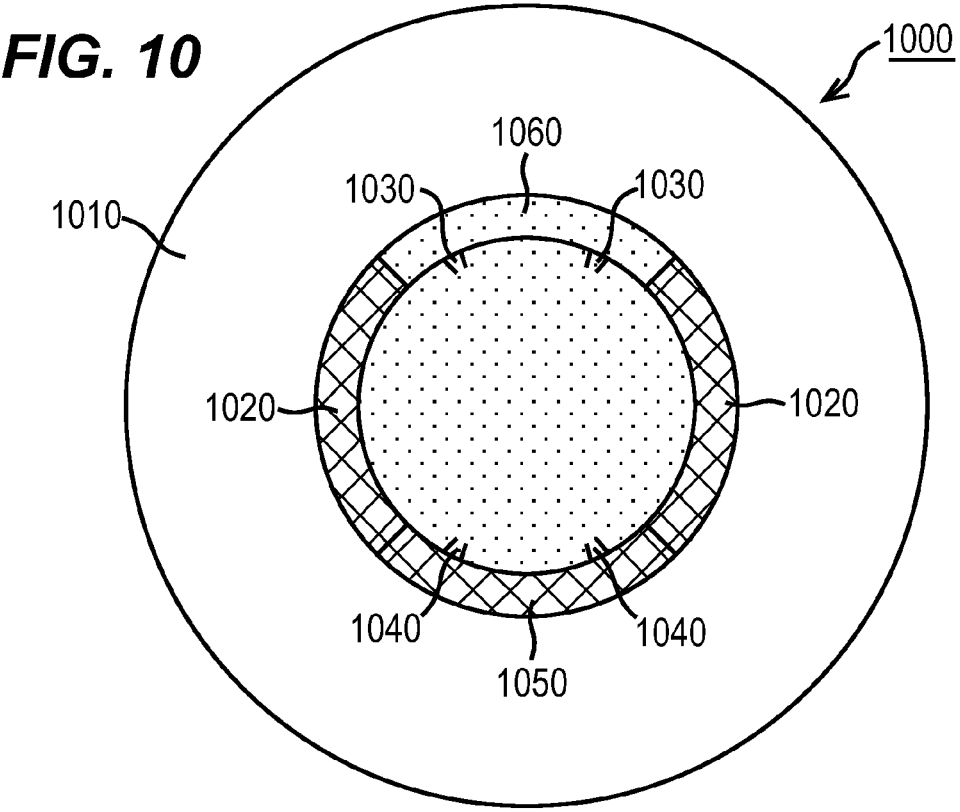

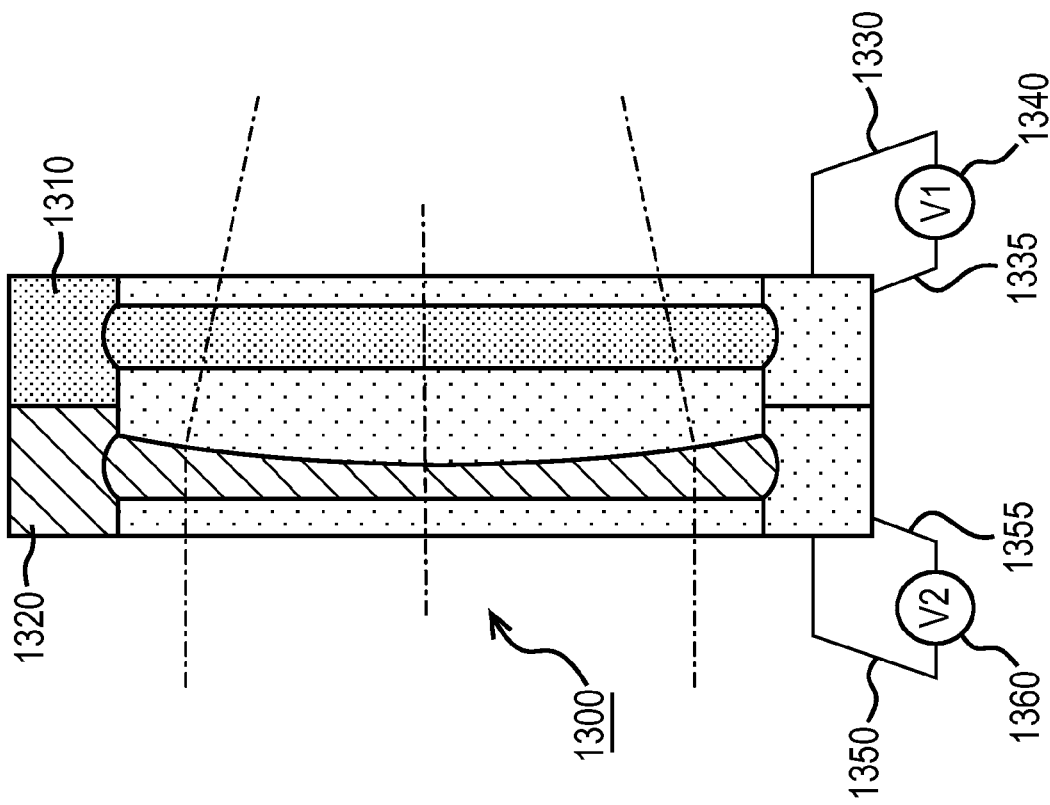
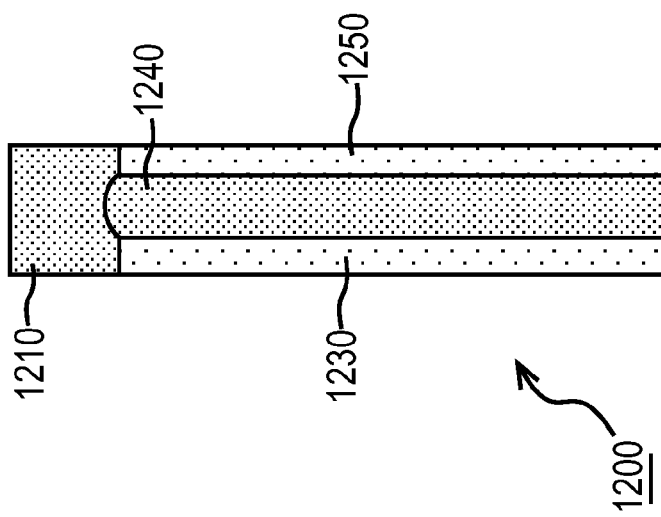

VARIABLE FOCUS ELECTROACTIVE OPHTHALMIC DEVICE

CROSS-REFERENCE TO RELATED APPLICATION

This application claims the benefit of U.S. Provisional Application No. 61/666,136 filed Jun. 29, 2012.

FIELD OF USE

The invention relates to an ophthalmic device with multiple states of focus and, more specifically, the fabrication of an ophthalmic lens with variable focus insert. In addition, light shading is incorporated in an ophthalmic device utilizing the inventive concepts.

BACKGROUND

Traditionally an ophthalmic lens, such as a contact lens or an intraocular lens provided a predetermined optical quality. A contact lens, for example, can provide one or more of: vision correcting functionality; cosmetic enhancement; and therapeutic effects, but only a set of vision correction functions. Each function is provided by a physical characteristic of the lens. Basically a design incorporating a refractive quality into a lens provides vision corrective functionality. A pigment incorporated into the lens can provide a cosmetic enhancement. An active agent incorporated into a lens can provide a therapeutic functionality.

To date optical quality in an ophthalmic lens has been designed into the physical characteristic of the lens. Generally, an optical design has been determined and then imparted into the lens during fabrication of the lens, such as, for example through cast molding, or lathing. The optical qualities of the lens have remained static once the lens has been formed. However, wearers may at times find it beneficial to have more than one focal power available to them in order to provide sight accommodation. Unlike spectacle wearers, who can change spectacles to change an optical correction, contact wearers or those with intraocular lenses have not been able to change the optical characteristics of their vision correction without significant effort.

SUMMARY

Accordingly, an ophthalmic lens with a variable optic portion which is capable of changing the optical effect of the lens in discrete manners is described. In addition, methods and apparatus for forming an ophthalmic lens, with this form of variable optic portion are presented. Some examples can also include a cast molded hydrogel contact lens with a rigid or formable energized insert that includes a variable optic. The insert can be included, for example, within the ophthalmic lens in a biocompatible fashion.

The variable focus ophthalmic device comprises a front curve optical portion of the variable focus ophthalmic device comprising a front curve top optical surface and a front curve bottom optical surface and a back curve optical portion of the variable focus ophthalmic device comprising a back curve top optical surface and a back curve bottom optical surface. A cavity is formed that can include a dielectric film and one or more electrode(s) capable of withstanding or establishing an electric field and where at least a portion of said dielectric film is in contact with one or more fluids that can be included in one or more reservoirs in fluid connection with said formed cavity. Said fluid connection may be via one or more channels that allow a flow of the one or more fluids included. Additionally, the fluid of the fluids may be controlled via a valve. For example, a check valve or a microelectromechanical valve.

The volume of the reservoir and the volume of the formed cavity may generally be equal. An electrode and dielectric film can be located on at least a portion of the surfaces forming the cavity, the channels and the reservoir.

Depending on the desired optical effect, the first and/or second fluid can additionally comprise a variety of light absorbing dye components, light shading dye components, and/or fluids with enantiomeric characteristics.

In another aspect of the present invention, the variable focus ophthalmic device can include an energy source in electrical communication with one or more of the included electrode(s). The energy source can be used to generate an electric current, or in some examples generate an electric field, which may be used to change the shape of an electroactive polymer used to displace a fluid.

An ophthalmic lens with a discretely variable optic portion apparatus for forming an ophthalmic lens with a discretely variable optic portion and methods for manufacturing the same is described. An energy source can be deposited onto a media insert and the insert can be placed in proximity to one, or both of, a first mold part and a second mold part. A reactive monomer mix is placed between the first mold part and the second mold part. The first mold part is positioned proximate to the second mold part thereby forming a lens cavity with the energized media insert and at least some of the reactive monomer mix in the lens cavity; the reactive monomer mix is exposed to actinic radiation to form an ophthalmic lens. Lenses are formed via the control of actinic radiation to which the reactive monomer mixture is exposed.

Moreover, the rigid or formable energized insert may be used as an ophthalmic device without being fully encapsulated within a cast molded contact lens body. In some of these cases, the insert may function as a portion of a lens on lens device or other type of ophthalmic device; including, in a non-limiting sense eye glasses and intraocular devices.

In an aspect, there is provided a variable focus ophthalmic device comprising: a front curve optical portion of the variable focus ophthalmic device comprising a front curve top optical surface and a front curve bottom optical surface; a back curve optical portion of the variable focus ophthalmic device comprising a back curve top optical surface and a back curve bottom optical surface; a cavity formed by the front curve bottom optical surface of the front curve optical portion of the variable focus ophthalmic device and the back curve top optical surface of the back curve portion of the variable focus ophthalmic device; a first fluid with a first index of refraction and a second fluid with a second index of refraction, wherein the first index of refraction and the second index of refraction are different and the two fluids are immiscible; a dielectric film in contact with at least a portion of one or more of the first or second fluids and overlying an electrode capable of establishing an electric field; and one or more reservoir regions for containment of a volume of fluid equal or approximately equal to the volume of the first fluid and wherein the reservoir is in fluid connection with said formed cavity.

The variable focus ophthalmic device may comprise an energy source in electrical communication with said electrode, wherein said energy source may provide an electric current capable of establishing the electric field.

The dielectric film may overlay more than one electrode.

The fluid connection between the reservoir and the formed cavity may be via one or more channels that allow for the flow of the first and second fluids.

The variable focus ophthalmic device may comprise a fluid control valve to control the flow of one or both the first and second fluids.

The fluid control device may comprise one or more check valves.

The fluid control device may comprise one or more microelectromechanical valves.

The volume of the reservoir and the volume of the formed cavity may be generally equal.

The electrode and dielectric film may be located on at least a portion of one or both of; the surfaces forming the cavity and the reservoir.

The dielectric film may be located on at least a portion of one or more of; the one or more channels between the cavity and the reservoir, the surfaces forming the cavity and the reservoir.

One or both the first or second fluids may additionally comprise a light absorbing dye component.

One or both the first or second fluid may additionally comprise a light shading dye component.

One or both the first or second fluid may comprise a component with enantiomeric characteristics.

The variable focus ophthalmic device may comprise an encapsulating ophthalmic lens.

The encapsulating ophthalmic lens may be made up of a biocompatible hydrogel.

The bottom optical surface of the back curve element may be positioned on the front curve portion of an ophthalmic lens.

The top optical surface of the back curve element may be positioned on the back curve portion of an ophthalmic lens.

One or more of the reservoir, the cavity formed or the channels may be formed by a generally deformable material that varies its shape under the influence of an electric current.

One or more of the reservoir, the cavity formed or the channels may be formed by a generally deformable material that varies its shape under the influence of an electric field.

At least a portion of said deformable material may be capable of varying its shape under the influence of an electric current comprises an electroactive polymer material.

DESCRIPTION OF THE DRAWINGS

The foregoing and other features and advantages of the invention will be apparent from the following, more particular description of preferred embodiments of the invention, as illustrated in the accompanying drawings.

FIG. 7 illustrates an exemplary ophthalmic element in one of its discrete optical states.

FIG. 8 illustrates an exemplary ophthalmic element in another of its discrete optical states.

FIG. 9 illustrates a side view of an exemplary ophthalmic element where different active regions of the element are identified.

FIG. 10 illustrates a side view of an exemplary ophthalmic element in one of its discrete optical states.

FIG. 12 illustrates an exemplary ophthalmic element wherein one of its discrete optical states acts to filter or shade incident light.

FIG. 13 illustrates an exemplary ophthalmic device formed from composite elements which have discrete optical states.

DETAILED DESCRIPTION

Figure 1:
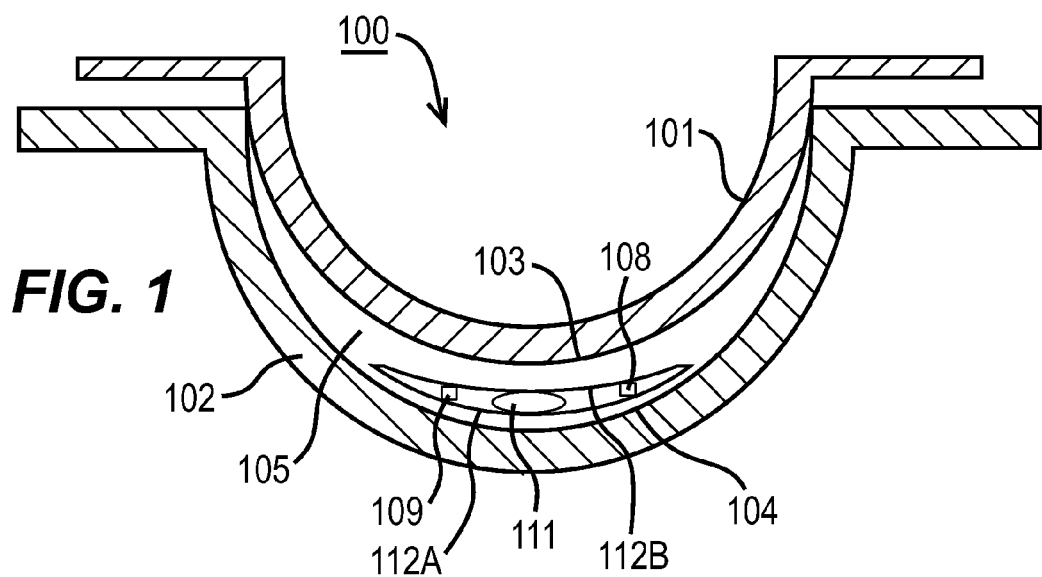
FIG. 1 illustrates a mold assembly apparatus according to an aspect of the present invention.

Methods and apparatus for manufacturing an ophthalmic lens with discretely variable optic portions are described. In addition, an ophthalmic lens with discretely variable optic portions incorporated into the ophthalmic lens is described.

In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

GLOSSARY

In this description and claims directed to the present invention, various terms may be used for which the following definitions will apply:

"Arcuate" as used herein, refers to a curve or bend like a bow shape.

"Concentric Annular Sections" as used herein, refers to one or more formed ring or spiral shaped optical structure(s) having a common center. For example, a series of ring shaped sections in the optical zone of an ophthalmic lens that may result in a diffractive lens which alters the power and the aberrations of the ophthalmic lens.

"Contact Angle" as used herein, refers to the angle at which the oil/saline solution interface, also referred to as the Liquid Meniscus Boundary, meets the Meniscus Wall. In the case of a linear Meniscus Wall, the contact angle is measured as the angle between the Meniscus Wall and the line tangent to the Liquid Meniscus Boundary at the point where the Liquid Meniscus Boundary meets the Meniscus Wall. In the case of a curved Meniscus Wall, the contact angle is measured as the angle between the lines tangent to the Meniscus Wall and the Liquid Meniscus Boundary at the point where they meet.

"Discretely Variable" as used herein, refers to the capacity to change an optical quality, such as for example the optical structure of a lens, in a stepwise fashion from a first state to at least a second distinct state.

"Electrowetting Microfluidic Lens" as used herein, refers to an Ophthalmic Lens that employs a relatively low power applied electric field to actuate or manipulate small volumes of one or more saline liquids, which may be referred to as saline-dielectric liquid(s), by altering the liquid(s)' interfacial tension and hence the contact angle, or by inducing liquid motion via direct electrical control of the electric field. Said actuation or manipulation can be reversible and therefore can be used to provide a variable power Lens without the need for mechanical components. More specifically, said saline-dielectric liquid(s) comprise optical properties, such as a specific desired index of refraction, which can function to change the Lens' optical effect as per the intended design. The optical effect can include for example optical power, light absorption, and light scattering properties. It will be apparent to those skilled in the art that a saline-dielectric liquid is an example of an electrowetting liquid. Electrowetting liquids may comprise, for example, an aqueous saline component or a non-polar fluid mixture.

"Energized" as used herein, refers to the state of being able to supply electrical current to or have electrical energy stored within.

"Energy" as used herein, refers to the capacity of a physical system to do work. Many instances of Energy used herein may relate to the said capacity being able to perform electrical actions in doing work.

"Energy Harvesters" as used herein, refers to device capable of extracting energy from the environment and converting it to electrical energy.

"Energy Source" as used herein, refers to the device capable of supplying Energy or placing a biomedical device in an Energized state.

"Lens" as used herein, refers to an article with a front surface and a back surface that is optically transmissive to a predefined range of wavelengths of radiation, such as, by way of example, visible light. A lens may include one or both of a front surface and a back surface which are essentially flat or one or both of a front surface and a back surface which are Arcuate in shape. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision.

"Lens Cavity" as used herein, refers to a space between the front curve-defining surface and the back curve-defining surface of an ophthalmic lens. In some ophthalmic lenses, for example in Arcuate liquid meniscus lenses, an oil and a saline solution can be maintained within the Lens Cavity space.

"Lens Forming Mixture" or "Reactive Mixture" or "RMM" (reactive monomer mixture) as used herein, refers to a monomer or prepolymer material which can be cured and crosslinked or crosslinked to form an ophthalmic lens. Various examples can include lens-forming mixtures with one or more additives such as: UV blockers, tints, photoinitiators or catalysts, and other additives one might desire in an ophthalmic lenses such as, contact or intraocular lenses.

"Lens Forming Surface" as used herein, refers to a surface that is used to mold a lens. Any such surface may have an optical quality surface finish, which indicates that it is sufficiently smooth and formed so that a lens surface fashioned by the polymerization of a lens forming material in contact with the molding surface is optically acceptable. Further, the lens-forming surface may have a geometry that is necessary to impart to the lens surface the desired optical characteristics, including without limitation, spherical, aspherical and cylinder power, wave front aberration correction, corneal topography correction and the like as well as any combinations thereof. Finally, the lens-forming surface may additionally include counteractive feature shapes as it may be desired in a particular lens design.

"Liquid Meniscus Boundary" as used herein, refers to one or more Arcuate surface interface(s) between the saline solution and the oil. For example, the surface can form one or more lenses that are concave on one side and convex on the other.

"Lithium Ion Cell" as used herein, refers to an electrochemical cell where Lithium ions move through the cell to generate electrical energy. This electrochemical cell, typically called a battery, may be reenergized or recharged in its typical forms.

"Media Insert" as used herein, refers to a formable or rigid substrate capable of supporting an Energy Source within an ophthalmic lens. The Media Insert may also include one or more variable optic lenses.

"Meniscus Wall" as used herein, refers to a specific area on the interior of the front curve lens, such that it is within the meniscus cavity, along which the liquid meniscus boundary moves.

"Mold" as used herein, refers to a rigid or semi-rigid object that may be shaped to aid in the defining of physical properties of the diffractive structures and/or of the shape design of the lens. The Mold may also be one or both of the front curve or back curve defining surface(s) of the Lens.

"Optical Zone" as used herein, refers to an area of a lens through which a user of the lens sees through. For example, the area in a ophthalmic lens though which a wearer of the ophthalmic lens sees "Power" as used herein, refers to work done or energy transferred per unit of time.

"Rechargeable" or "Re-energizable" as used herein, refers to a capability of being restored to a state with higher capacity to do work. Many uses described herein may relate to the capability of being restored with the ability to flow electrical current at a certain, pre-established time period.

"Reenergize" or "Recharge" as used herein, refers to the restoration of an Energy Source to a state with higher capacity to do work. Many uses described herein may relate to restoring a device to the capability to flow electrical current at a certain rate for a certain, reestablished period.

"Sharp" as used herein, refers to a geometric feature of an internal surface of either a front curve or back curve lens defining surface sufficient to contain the location of a contact line of two predefined fluids on the optic. The Sharp is usually an outside corner rather than an inside corner. From a fluid standpoint can be an angle greater than 180 degrees.

"Substrate" as used herein, refers to a physical entity upon which other entities are placed or formed.

"Variable Optic" as used herein, refers to the capacity to change an optical quality, such as for example the optical structure of a lens.

Referring now to FIG. 1, an ophthalmic lens 100 with an embedded discretely Variable optic portion 111 may include an energy source 108, 109, such as an electrochemical cell or battery as the storage means for the energy and in some examples, encapsulation and isolation of the materials comprising the energy source from an environment into which an ophthalmic lens is placed. The energy source 108, 109 can provide power to activate the variable optic portion.

A diagram of an exemplary mold 100 for an ophthalmic lens is illustrated with a discretely variable optic portion 111. A mold can include a form 100 having a cavity 105 into which a lens forming mixture can be dispensed such that upon reaction or cure of the lens forming mixture, an ophthalmic lens of a desired shape is produced. The molds and mold assemblies 100 of some parts can be made up of more than one "mold parts" or "mold pieces" 101-102. The mold parts 101-102 can be brought together such that a cavity 105 is formed between the mold parts 101-102 in which a lens can be formed. This combination of mold parts 101-102 is preferably temporary. Upon formation of the lens, the mold parts 101-102 can again be separated for removal of the lens.

At least one mold part 101-102 has at least a portion of its surface 103-104 in contact with the lens forming mixture such that upon reaction or cure of the lens forming mixture that surface 103-104 provides a desired shape and form to the portion of the lens with which it is in contact. The same is true of at least one other mold part 101-102.

Thus, for example, a mold assembly 100 may be formed from two parts 101-102, a female concave piece (front piece) 102 and a male convex piece (back piece) 101 with a cavity formed between them. The portion of the concave surface 104 which makes contact with lens forming mixture has the curvature of the front curve of an ophthalmic lens to be produced in the mold assembly 100 and is sufficiently smooth and formed such that the surface of an ophthalmic lens formed by polymerization of the lens forming mixture which is in contact with the concave surface 104 is optically acceptable.

The front mold piece 102 may also have an annular flange integral with and surrounding circular circumferential edge and which can extend from it in a plane normal to the axis and extending from the flange (not shown).

A lens-forming surface may include a surface 103-104 with an optical quality surface finish, which indicates that it is sufficiently smooth and formed so that a lens surface fashioned by the polymerization of a lens forming material in contact with the molding surface is optically acceptable. Further, the lens forming surface 103-104 may have a geometry that is necessary to impart to the lens surface any desired optical characteristics, including without limitation, spherical, aspherical and cylinder power, wave front aberration correction, corneal topography correction and the like as well as any combinations thereof. According to an aspect of the present invention, optical characteristics can work in concert with a discretely variable optic portion 111 to provide an overall optical quality.

A discretely variable optic portion can provide a change in one or more optical characteristic of a lens. Some examples may also include moving a liquid within the lens to change the optical qualities of the lens. By way of non-limiting examples, it is preferred that the optical power of a discretely variable optic portion 111 be capable of changing in discrete steps to between 0.1 and 25 diopters. Other examples may include less optical power change, where for example, such lower power is chosen in order to obtain a thinner discretely variable optic portion 111. Some preferred examples therefore may include a discretely variable optic portion 111 which may be capable of discrete changes, for example of between 1 and 4 diopters of change in optical power.

A discretely variable optic portion 111 may include, by way of non-limiting example electrowetting on dielectric ("EWOD"), the EWOD can include any films sufficient to resist dielectric breakdown when placed in an electric field. For example, the films may have thicknesses ranging from 100 nanometers to 50 microns. More specifically, in the preferred examples, thick films are included, such as between 10 to 30 microns or thin films are included, such as between 10 to 30 nanometers. Thin films may also be referred to electrowetting on nano-scaled dielectric ("EWOND").

A discretely variable focal length lens may include, for example, two transparent borders 112A and 112B generally parallel to one another and delimiting, at least in part, an internal volume containing two non-miscible liquids having different optical indices. An elastic/flexible element may be positioned such that it will deform in response to a change in pressure of the liquids. The pressure of the liquids may be changed in response to an electrical field projected towards one or both of the liquids.

A discretely variable lens may include a discretely variable electrowetting microfluidic lens including a liquid containing cell for retaining a volume of one or more liquids. One or more of the liquids may be conductive and one or more of the liquids may be insulating. The conductive liquid can be typically an aqueous liquid, and the insulating liquid can be typically an oily liquid, or a non-polar fluid mixture.

A user controlled adjustment device can be used to focus the lens. The adjustment device can include, by way of non-limiting example, any electronic device or passive device capable of sending a signal for increasing or decreasing a voltage output. Some examples can also include an automated adjustment device for focusing the lens via an automated apparatus according to a measured parameter or a user input. User input may include, for example a switch controlled by wireless apparatus. Wireless may include one or more of: radio frequency control, magnetic switching and inductance switching. User input may additionally occur for example via a pressure sensor, blink detector, light sensor, or light-based control etc.

A lens with a discretely variable optic portion 111 may include an insert placed into a lens wherein the insert may include a rigid center soft skirt design in which a central rigid optical element including the discretely variable optic portion 111 may be in direct contact with the atmosphere and the corneal surface on respective anterior and posterior surfaces, wherein the soft skirt of lens material (typically a hydrogel material) is attached to a periphery of the rigid optical element and the rigid optical element which can additionally act as a media insert providing energy and functionality to the resulting ophthalmic lens.

Some additional examples may include a discretely variable optic portion 111 that is a rigid lens or formable lens insert fully encapsulated within a hydrogel matrix. A discretely variable optic portion 111 which may be a rigid lens insert may be manufactured, for example using microinjection molding technology.

Microinjection molding may include, for example, a poly (4-methylpent-1-ene copolymer resin with a diameter of between about 6 mm to 10 mm and a front surface radius of between about 6 mm and 10 mm and a rear surface radius of between about 6 mm and 10 mm and a center thickness of between about 0.050 mm and 0.5 mm. Some exemplary embodiments include an insert with diameter of about 8.9 mm and a front surface radius of about 7.9 mm and a rear surface radius of about 7.8 mm and a center thickness of about 0.100 mm and an edge profile of about 0.050 mm radius. One exemplary micromolding machine may include the Microsystem 50 five-ton system offered by Battenfield Inc.

The discretely variable optic portion 111 insert may be placed on a mold part 101-102 utilized to form an ophthalmic lens. Mold part 101-102 material may include, for example: a polyolefin of one or more of: polypropylene, polystyrene, polyethylene, polymethyl methacrylate, and modified polyolefins. Other molds may include a ceramic, glass, quartz, plastic, or metallic materials.

A preferred alicyclic co-polymer contains two different alicyclic polymers. Various grades of alicyclic co-polymers may have glass transition temperatures ranging from about 105° C. to 160° C.

In some examples, the molds may contain polymers such as polypropylene, polyethylene, polystyrene, poly(methyl methacrylate), modified polyolefins containing an alicyclic moiety in the main chain, and cyclic polyolefins. This blend may be used on either or both mold halves, where it is preferred that this blend is used on the back curve and the front curve consists of the alicyclic co-polymers.

In some preferred methods of making molds 100, injection molding is utilized according to known techniques, however, molds fashioned by other techniques including, for example: lathing, diamond turning, or laser cutting are also included.

Typically, lenses are formed on at least one surface of both mold parts 101-102. However, one surface of a lens may be formed from a mold part 101-102 and another surface of a lens can be formed using a lathing method, or other methods.

Lenses

Figure 2:
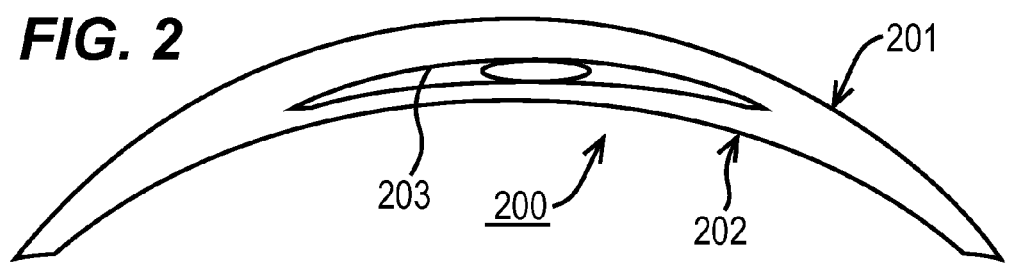
FIG. 2 illustrates aspects of an ophthalmic lens with a discretely variable optic portion.

Referring now to FIG. 2 elements of an Ophthalmic lens including discretely variable optic lens portions are illustrated as item 200. A first transparent border 201 and a second transparent border 202 are defined by a molding process. Within the body of the ophthalmic lens, a discretely variable optic component may be located as indicated by component 203. The component 203 may take the form of an insert device.

A preferred lens material includes a silicone-containing component. A "silicone-containing component" is one that comprises at least one [—Si—O—] unit in a monomer, macromer, or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

Suitable silicone containing components include compounds of Formula I

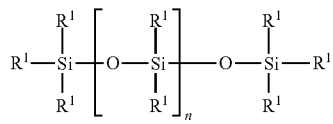

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some examples between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-42}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one example the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one example, b is zero, one $R^1$ is a monovalent reactive group, and at least 3 $R^1$ are selected from monovalent alkyl groups having one to 16 carbon atoms, and in another example from monovalent alkyl groups having one to 6 carbon atoms. Non-limiting examples of silicone components of this example include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another example, b is 2 to 20, 3 to 15 or in some examples 3 to 10; at least one terminal $R^1$ comprises a monovalent reactive group and the remaining $R^1$ are selected from monovalent alkyl groups having 1 to 16 carbon atoms, and in another example from monovalent alkyl groups having 1 to 6 carbon atoms. In yet another example, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this example include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another example, b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In one example, where a silicone hydrogel lens is desired, the lens will be made from a reactive mixture comprising at least about 20 and preferably between about 20 and 70% wt silicone containing components based on total weight of reactive monomer components from which the polymer is made.

In another example, one to four $R^1$ comprises a vinyl carbonate or carbamate of the formula:

Formula II

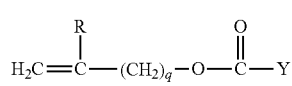

wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

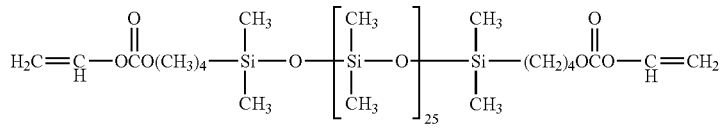

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

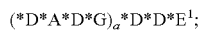

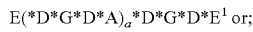

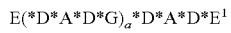                    Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$a$ is at least 1;

A denotes a divalent polymeric radical of formula:

Formula VII

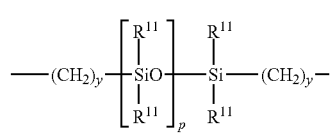

$R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

Formula VIII

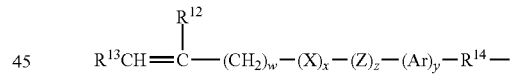

wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

Formula IX

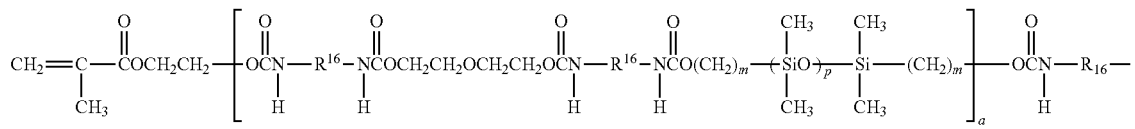

-continued

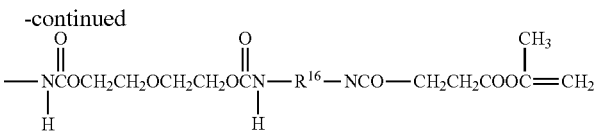

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X

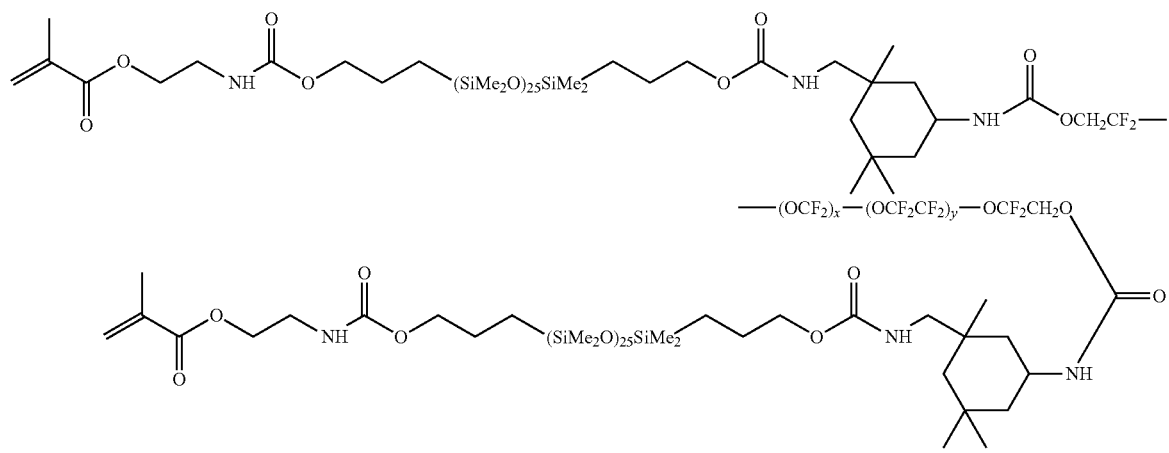

Other suitable silicone containing components include macromere containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone containing component.

Processes

The following method steps are provided as examples of processes that may be implemented according to aspects of the present invention. It should be understood that the order in which the method steps are presented is not meant to be limiting and other orders may be used. In addition, not all of the steps are required and additional steps may be included.

Figure 4:
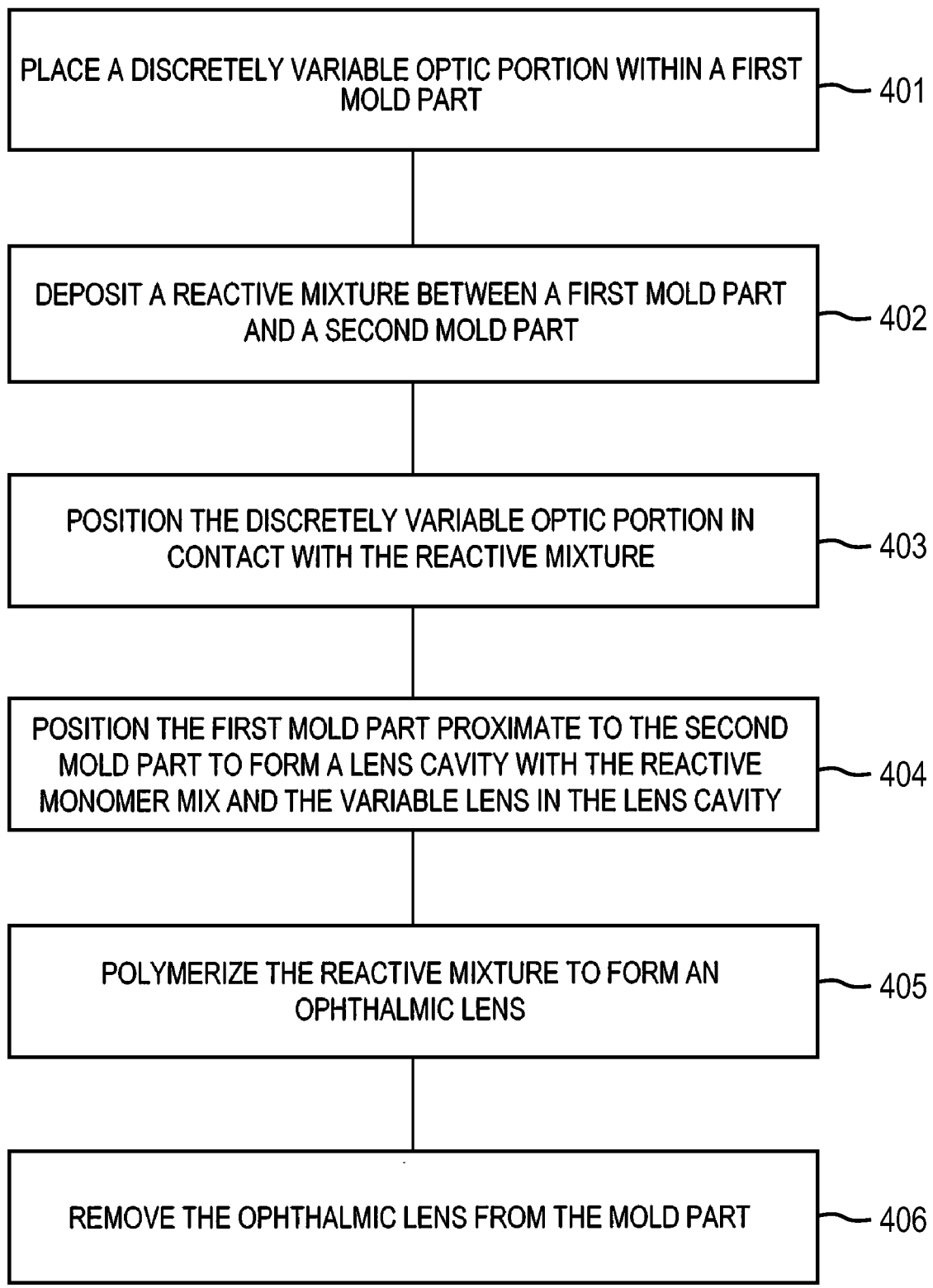
FIG. 4 illustrates method steps according to an aspect of the present invention.

Referring now to FIG. 4, a flowchart illustrates exemplary steps that may be used to implement an aspect of the present invention. At 401, a discretely variable optic portion is placed within a mold part. The discretely variable optic portion may contain one or more components.

The discretely variable optic portion may be placed in the mold part via mechanical placement. Mechanical placement can include, for example, a robot or other automation, such as those known in the industry to place surface mount components. Human placement of a discretely variable optic portion is also envisaged. Accordingly, any mechanical placement or automation may be utilized which is effective to place a discretely variable optic portion with an energy source within a cast mold part such that the polymerization of a reactive monomer mixture contained by the mold part will include the discretely variable optic in a resultant ophthalmic lens.

A discretely variable optic portion may be placed in a mold part or substrate. Accordingly, an energy source and one or more components may also be attached to the substrate/mold part and can be in electrical communication with the discretely variable optic portion. Components may include for example, circuitry to control power applied to the discretely variable optic portion. Additionally, a component may include one or more control mechanisms for actuating the discretely variable optic portion to change one or more optical characteristics, such as, for example, a change of state between a first optical power and a second optical power.

A processor device, MEMS, NEMS or other component may also be placed into the discretely variable optic portion and in electrical contact with the energy source. The substrate may contain one or both of flexible and rigid materials.

At 402, a reactive monomer mix may be deposited into a mold part.

At 403, the discretely variable optic is positioned in contact with the reactive mixture within the first mold part.

At 404, the first mold part is placed proximate to a second mold part to form a lens forming cavity with at least some of the reactive monomer mix and the discretely variable optic portion in the cavity. As discussed above, preferred examples include an energy source and one or more components also within the cavity and in electrical communication with the discretely variable optic portion, and in some examples all of these components may also be contained within the discretely variable optic component itself.

At 405, the reactive monomer mixture within the cavity is polymerized. Polymerization may be accomplished, for example, via exposure to one or both of actinic radiation and heat. At 406, the ophthalmic lens can be removed from the mold parts with the discretely variable optic portion adhered to and/or encapsulated within the polymerized material making up the ophthalmic lens.

Although hard or soft contact lenses made of any known lens material may be provided, or material suitable for manufacturing such lenses, preferably, the lenses are soft contact lenses having water contents of about 0 to about 90 percent. More preferably, the lenses may be made of monomers containing hydroxy groups, carboxyl groups, or both or be made from silicone-containing polymers, such as siloxanes, hydrogels, silicone hydrogels, and combinations thereof. Material useful for forming the lenses may be made by reacting blends of macromers, monomers, and combinations thereof along with additives such as polymerization initiators. Suitable materials include, without limitation, silicone hydrogels made from silicone macromers and hydrophilic monomers.

Figure 5:
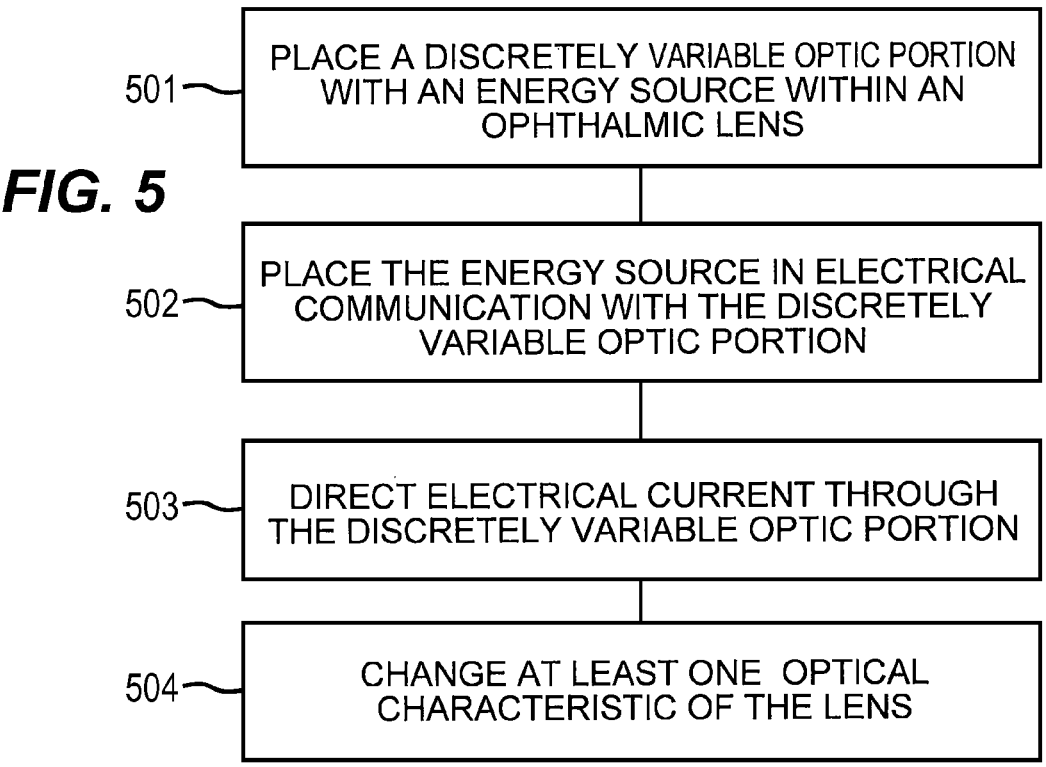
FIG. 5 illustrates method steps according to an aspect of the present invention.

Referring now to FIG. 5, at 501, a discretely variable optic portion may be placed within an ophthalmic lens, as discussed above. At 502, the discretely variable optic portion is placed in electrical communication with an energy source. Electrical communication may be accomplished, for example, via circuitry incorporated into the discretely variable optic portion or via pathways ink jetted or otherwise formed directly upon lens material.

At 503, electrical energy can be directed through the discretely variable optic portion incorporated into the ophthalmic lens. The energy may be directed, for example, via electrical circuitry capable of sustaining a voltage across at least a portion of a dielectric film. For example and in a non-limiting sense, an electrical current can flow to an EWOD device when it is activated and the dI/dt may generally follow the profile of a charging capacitor. By shifting the voltage level on either side (e.g., by energizing), then a capacitor may be effectively charged up. The charging of a capacitor can involve an initial "high" current that may taper off with time in an exponential decay. Further, the capacitor may never fully charge so generally there can always an infinitesimally small (immeasurable) current flowing that may not be enough to cause a significant change to the variable optic portion.

To the contrary, when it is energized, the discretely variable optic may change at least one optical characteristic of the lens 504.

Apparatus

Figure 3:
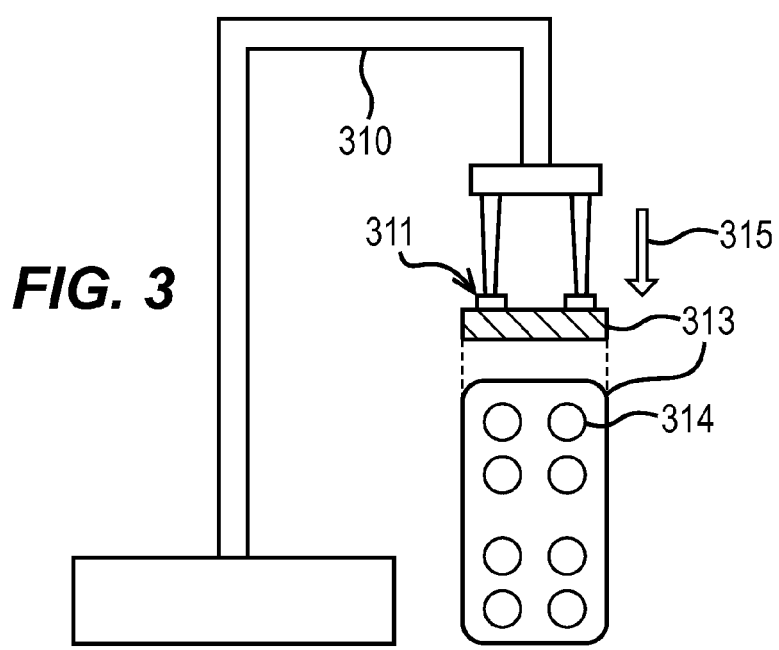
FIG. 3 illustrates an apparatus for placing a discretely variable optic portion within an ophthalmic lens mold part.

Referring now to FIG. 3, automated apparatus 310 is illustrated with one or more transfer interfaces 311. Multiple mold parts, each with an associated discretely variable optic insert 314 are contained on a pallet 313 and presented to transfer interfaces 311. The apparatus, may include, for example a single interface individually placing discretely variable optic insert 314, or multiple interfaces (not shown) simultaneously placing discretely variable optic inserts 314 into the multiple mold parts, and in some examples, in each mold part. Placement may occur via vertical movement 315 of the transfer interfaces 311.

Another aspect of the present invention includes an apparatus to support the discretely variable optic insert 314 while the body of the ophthalmic lens is molded around these components. The discretely variable optic insert 314 and an energy source may be affixed to holding points in a lens mold (not illustrated). The holding points may be affixed with polymerized material of the same type that will be formed into the lens body. Other examples include a layer of prepolymer within the mold part onto which the discretely variable optic insert 314 and an energy source may be affixed.

Figure 6:
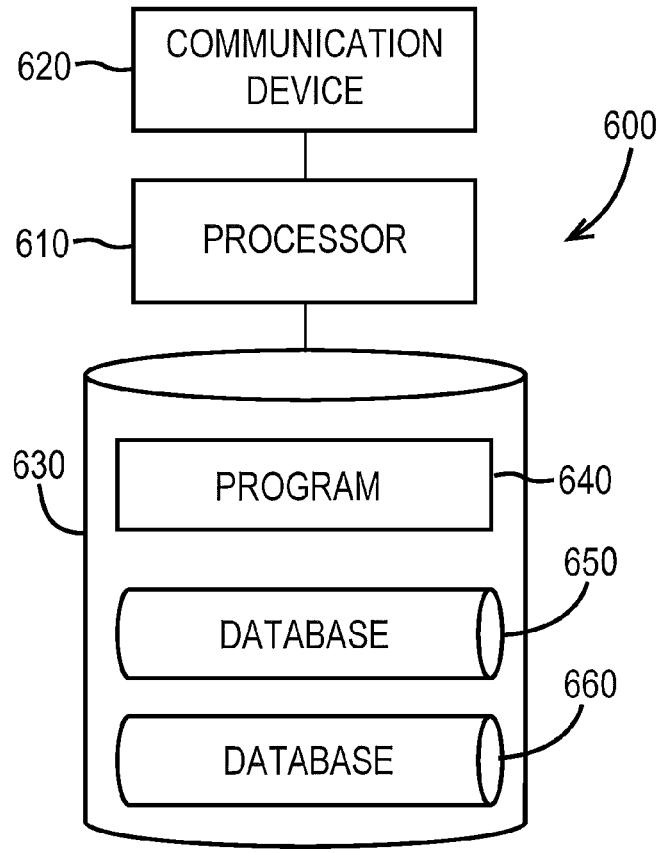
FIG. 6 illustrates a processor that may be used to implement an aspect of the present invention.

Referring now to FIG. 6 a controller 600 is illustrated that may be used in aspects of the present invention. The controller 600 includes a processor 610, which may include one or more processor components coupled to a communication device 620. A controller 600 may be used to transmit energy to the Energy Source placed in the ophthalmic lens.

The controller may include one or more processors, coupled to a communication device configured to communicate energy via a communication channel. The communication device may be used to electronically control one or more of: the placement of a discretely variable optic insert into the ophthalmic lens and the transfer of a command to operate a discretely variable optic device.

The communication device 620 may also be used to communicate, for example, with one or more controller apparatus or manufacturing equipment components.

The processor 610 is also in communication with a storage device 630. The storage device 630 may comprise any appropriate information storage device, including combinations of magnetic storage devices, optical storage devices, and/or semiconductor memory devices such as Random Access Memory (RAM) devices and Read Only Memory (ROM) devices.

The storage device 630 may store a program 640 for controlling the processor 610. The processor 610 performs instructions of the program 640, and thereby operates in accordance with an aspect of the present invention. For example, the processor 610 can be in communication with one or more sensors and may receive information descriptive of discretely variable optic insert placement, processing device placement, and the like. The storage device 630 can also store ophthalmic related data in one or more databases 650, 660. The database 650, 660 may include specific control logic for controlling energy to and from a Discretely Variable optic lens.

Electrowetting on Dielectric Discretely Variable Optic Lenses

Proceeding to FIG. 7, an exemplary discretely variable optic lens is depicted 700. The lens may comprise two different fluids that have different and preferably opposite wetting properties. For example, a first solution may comprise an aqueous fluid as might be the case for a water solution of salt. In some examples, the aqueous fluid will preferably be a high efficiency electrowetting solution. The high efficiency electrowetting solution or aqueous fluid may have an approximate index of refraction approximate to that of water, air, or that of the material included in the optic regimes depending on the product design and materials used. This index of refraction may be assumed different from the index of refraction of the material that makes up the hard portions of the lens device.

Continuing with FIG. 7, the hard portions of the lens device may define the boarders of various aspects of the lens. Reservoirs 710 and 770 may contain fluids on the external portion of the optic zone portion of the lens. Lens components 720 and 750 may include active optic surfaces and also act in a manner to contain the fluids in the lens. A cavity 740 may be present between a front lens piece 720 and the rear lens piece 750.

A lens piece 720 comprising roughly equivalent shapes for front and back surfaces may result in little optical path change in light beams, as for example 730, for light that passes through them. However, a significant difference between its front and back surface 750 may result in changes to the optical path of light; which in some cases may reflect changes in optical power, as depicted in line 760 and 730.

In the case where the fluid is in the reservoir, 710 and the fluid includes an aqueous fluid that has a significantly different index of refraction as compared to the materials that make up items 720 and 750 the surfaces of the cavity, 740, the two lens pieces become optically relevant to light traversing the cavity 740 when the fluid is in the reservoir 710.

A second reservoir 770 may comprise a second fluid. In an exemplary sense, this fluid may have different characteristics when compared to the aqueous fluid depicted in item 710 and 740. This second fluid may be an oil-like fluid and may be chosen to have an index of refraction with optical wavelengths approximately equal to that of the lens pieces 720 and 750.

The discretely variable optic element may have electrical connections 780 and 785 that may be connected by conductive interconnects. In addition, component 790 to energize, control and distribute electrical charge so that a voltage (V1) may be applied across components within the discretely variable optic element can be included. In the case of FIG. 7, the voltage (V1) may represent an appropriate condition where the stable location of fluids can include the exemplary aqueous fluid being located in its reservoir 710 and also in the cavity 740.

Proceeding to FIG. 8, item 800 a representation is depicted of the discretely variable optic element of FIG. 7 in a second state. In this case the fluid that was depicted in the bottom reservoir, which in FIG. 8 is reservoir 870, was indicated to be an oily substance which was chosen to have an index of refraction that matched or was sufficiently close to that of the optic pieces 850 and 820. Due to a change in the voltage applied by item 890, which may be represented as a second voltage condition (V2) with the voltage being applied to the discretely variable optic element through connections 880 and 885, the fluid that may now reside in cavity 840 may now be the same as that in reservoir 870 and not the same as that in reservoir 810. Consequently, light that proceeds to the device 830 and through the optic element 820, the cavity 840, and the optic element 850 may not be significantly altered when it emerges from the component as item 860. Some exemplary description has been given to the characteristics of the fluids and certain fluids have been identified as aqueous or oily type or to have other characteristics. These characteristics are described for exemplary purposes only and it will be apparent to one skilled in the arts that many different types of fluids may be chosen to function within the scope of the inventive art herein.

Referring now to FIG. 9, a top view cross section depicted in items 700 and 800 is depicted. Lens power components may have one or more materials used to encapsulate other components within it. In external regions of a component, this encapsulating material may be present alone, as may be the case in the region around item 910. Proceeding into the optically active portion of a lens component, in FIG. 9, you can observe a number of different component types.

In the exemplary annular ring shown in 900, there may be four different regions demonstrated by the two regions 920 and regions 950 and 960. In this example, region 960 may represent the top reservoir from preceding discussions while the region 950 may represent the bottom reservoir. In fact, these reservoirs and the regions 920 may be envisioned to be open for flow between the regions; however, the surfaces of regions 950 and 960 may be treated by various types of processing including surfactants, surface preparations, or surface treatments that could favor adherence of a particular fluid type in one or more of the region(s). Alternately, regions 920 represent regions where electrodes may be present which may allow for the voltage condition or magnetic field described above to be applied across the surfaces in these regions. Accordingly, when electrical potential is applied across a surface, an electro wetting on dielectric effect can be engaged. With a particular electrical potential application, the surface can favor one fluid while with a different electrical potential the other fluid may be favored.

If the volume of the reservoir regions 920 is designed and made to be approximately equal to the volume of the cavity between the top and bottom lens surfaces, then when the state of regions 920 can be altered with a change in electrostatic potential then one of the fluids can be attracted to regions 920 while the other is repelled. When these forces are caused to occur and the fluids are immiscible, the fluids may consequently be caused to trade places. Items 930 and 940 represent flow channels that allow for the flow of fluid from the reservoir regions 950 and 960 into the lens cavity. While two channels for each reservoir are depicted, it may be apparent that numerous variations may be possible and consistent with the art herein.

Proceeding now to FIG. 10, the applied electrical potential condition as depicted in FIG. 7, may be operant, 1000. Lens power components may have one or more materials used to encapsulate other components within it. In external regions of a component, this encapsulating material may be present alone, as may be the case in the region around item 1010. In this case the applied electrical potential may alter the electrode regions 1020 such that their Electrowetting characteristics can be consistent with the fluid in reservoir 1050 wetting the surface and being favored to occupy the volume of regions 1020. This can pull the fluid out of the lens cavity into region 1050 and then into regions 1020. At the same time, the same forces may force the fluid that typically occupies region 1060 to flow into the cavity region. Items 1030 and 1040 represent flow channels that allow for the flow of fluid from the reservoir regions 1050 and 1060 into the lens cavity. As mentioned in the description of FIG. 7, this can cause the discretely variable optic element to assume a first optical state.

Figure 11:
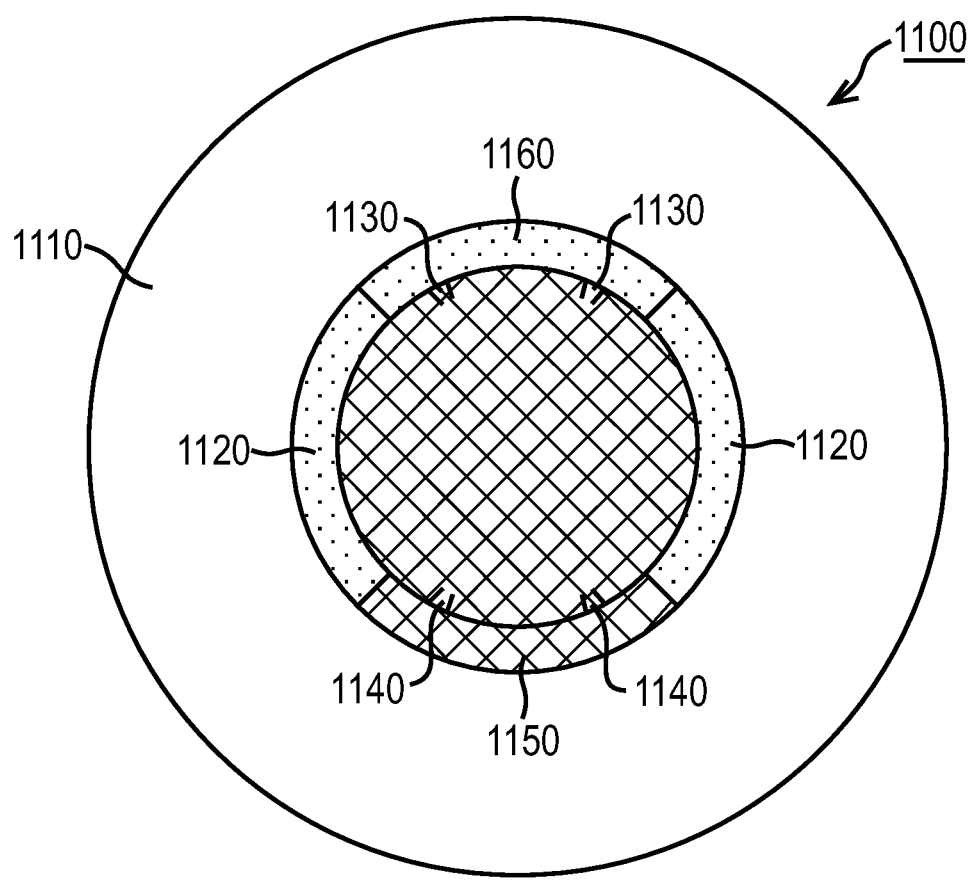
FIG. 11 illustrates a side view of an exemplary ophthalmic element in another of its discrete optical states.

Proceeding to FIG. 11, item 1100, a second optical state may be represented for the discretely variable optic element. Lens power components may have one or more materials used to encapsulate other components within it. In external regions of a component, this encapsulating material may be present alone, as may be the case in the region around item 1110. In this case, as depicted in FIG. 8, a second electrical potential condition may be established in a lens. In this example, this second condition would reverse which of the two fluids is favored to occupy the regions 1120. Under this change of electrical potential conditions, then, fluid from the cavity region may be forced out through flow channels as depicted by items 1130 and may continue to flow to occupy regions 1120 and 1160. As well, by the same forces as discussed for FIG. 10, this can impel the fluid out of the regions 1120 into the reservoir region 1150 and then from the reservoir region 1150 through the flow channels 1140 and into the cavity. In this manner, the fluid occupying the cavity may have a different index of refraction that now causes the discretely variable optic element to assume a second optical state as described in the discussion concerning FIG. 8.

There have been numerous examples made in reference to the manner that electrowetting on dielectrics may be used to control the optical state in an optical element such as described herein; however, it will be clear to one skilled in the art that numerous alterations may be possible to result in similar effects that are consistent with the present invention.

Multiple State Ophthalmic Devices where the State Change is a Filtering Effect

Proceeding to FIG. 12, item 1200, a different type of optical effect is depicted. The methods and device aspects that cause the discretely variable optic element changes that have been discussed may have similar effect in this example. However, it may be possible to cause a light shading or filtering effect to occur rather than a change in optic power or in addition to the change in optic power. In an exemplary sense, the two lens surfaces 1230 and 1250 can be depicted in a simplified sense to have no significant differential aspect between the various surfaces; so that light will not be significantly changed relative to the path that beams will take when proceeding across the optic device. In examples where a particular light absorbing component is present in one of the two types of fluid in the lens, then that component could represent a filtered state relative to the other component. In an exemplary sense, the fluid placed in reservoir 1210 may represent the dyed fluid which the fluid in reservoir 1220 may be the un-dyed fluid. Upon the application of the appropriate electrical potential condition, for example by the action of element 1290 through electrical contacts 1280 and 1285 the dyed fluid may be forced into the cavity 1240, consequently providing a filtered or shaded state relative to the other state that could be determined with a second electrical potential condition.

The nature of the filtering of this type can correspond to numerous possibilities. For example, a dye may be chosen to scatter, absorb, or otherwise block light across a broad amount of the visible spectrum. This may result in reducing intensity of a significant portion of visible or non-visible wavelengths proceeding across the lens device. In other examples, the dye may absorb a particular band of frequencies of optical light proceeding through the lens device. In some examples, the dyes may be used in the fluids in lenses of the type discussed in FIGS. 7 through 11 as well. In other examples, the dyes used may have enantiomeric characteristics. There will be numerous examples that result from different types of materials that can be present in one or more of the fluids in the lenses described herein.

Proceeding now to FIG. 13, item 1300. There may be the capability to create combinations of the lenses as depicted herein. As shown, there may be an optic element of the type described in FIG. 12 where the internal and external surfaces may be shaped not to alter the optic power of light traversing the element, and an optic element of the type described in association with FIGS. 7 and 8. Furthermore, in an alternate design it can be possible that an optical element performs a desired function and thereby in conjunction with a second portion that may alter the optic power of the lens.

A discretely variable optic element and a light shading or filtering effect optic element 1300 are depicted. In this example, two reservoirs are depicted at 1320 and 1310 for liquids used for the variable optic element and the light shading optic element respectively. The functionality can be, as described previously, due to a change in the voltage applied by items 1360 and 1340. However, the optic change may occur at different times in both optic elements or at approximately or the same time as it may be desired. In examples where it is desired that both optic elements change the voltage at different times or upon different signals, different contacts may be used as depicted in 1350, 1355, 1330, and 1335. However, it may be desired that these act in concert with each other and therefore only one set of contacts may be required.

Electroactive Pumping for Discretely Variable Optic Lenses

Figure 14:
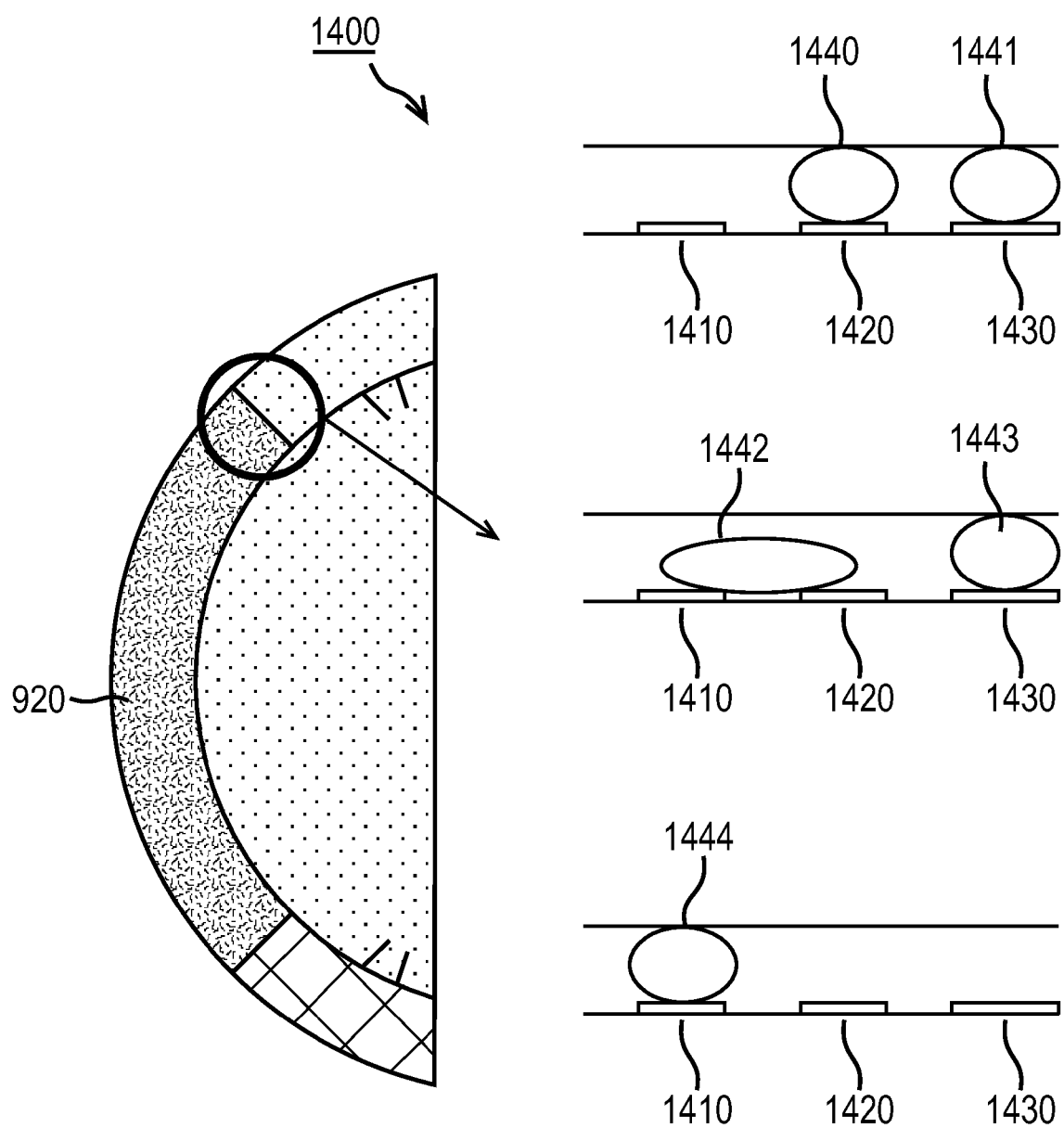
FIG. 14 illustrates an exemplary mechanism for generating a change in the state of the discretely variable optic lens.

Referring now to FIG. 14, item 1400, a different exemplary mechanism for generating a change in the state of the discretely variable optic lens is depicted. In this type of mechanism, fluids may be pumped from and to a storage region partially or wholly by using the electrowetting on dielectric effect. On the perimeter of the storage region 920, electrowetting surfaces and features can be included. When the potential is changed on the electrowetting surface a drop of fluid, as may be seen by item 1440 which is shown sitting on pad 1420 may flatten out as is shown at 1442. At 1442 the drop of fluid flattens and may spread vertically to thereby interact with and be attracted by pad 1410. As a controller of the electropotential that may be applied to the pads cycles the potential on the pads fluid drops can be transported or pumped from one region to another. If the fluid is pumped into the lens cavity region it thereby may change the optical characteristics of the discretely variable optic lens in a manner similar to that discussed in previous sections.

A second drop feature 1441 on pad 1430 may also be moved in a similar fashion by the cycling of electropotential on the pads. Eventually the drop of fluid may be moved from pad 1430 to pad 1420 and then to pad 1410. A single fluid may be used in this fashion where the lack of the fluid may define a different index of refraction than the lens elements. Thereafter, if the aforementioned pumping mechanism is used to pump the fluid into the cavity it may then match the index of refraction of the lens elements and therefore change the optical effect. For example, due to the index of refraction of a gas that would fill the optical element when the liquid is contained in the reservoir(s).

Two fluids may be used in a similar fashion. In this case, the pumping mechanisms may act in concert where one fluid may be pumped into its storage location while the other is pumped out of its storage location. In these examples, one of the two regions labeled as 920 may be used to store the first liquid while the other region labeled as 920 may be used to store the second liquid. The inner geometry of the lens device, for example where the lens device is item 900, may then have additional definition in this case. For example, there may be a plastic feature at one of the ends of each of the regions 920 to create a type of cavity for the storage of the particular fluid associated with that region.

Since electrowetting on dielectric effect to effect a pumping mechanism is used, they may have a benefit related to the energy consumed in forming a variable (in this case 2 state) lens device. Since, the pads that are used for pumping can be formulated to repel a fluid in its region unless a potential is applied to them, then when the lens device 900 is placed into one of its states there will be at least one of the two storage regions where the pads create a barrier to fluid movement in its proximity. Thus, unlike some other examples of a variable lens, there may be a very limited consumption of energy stored in an energization device when the lens device is not changing from one state to another.

Figure 15:
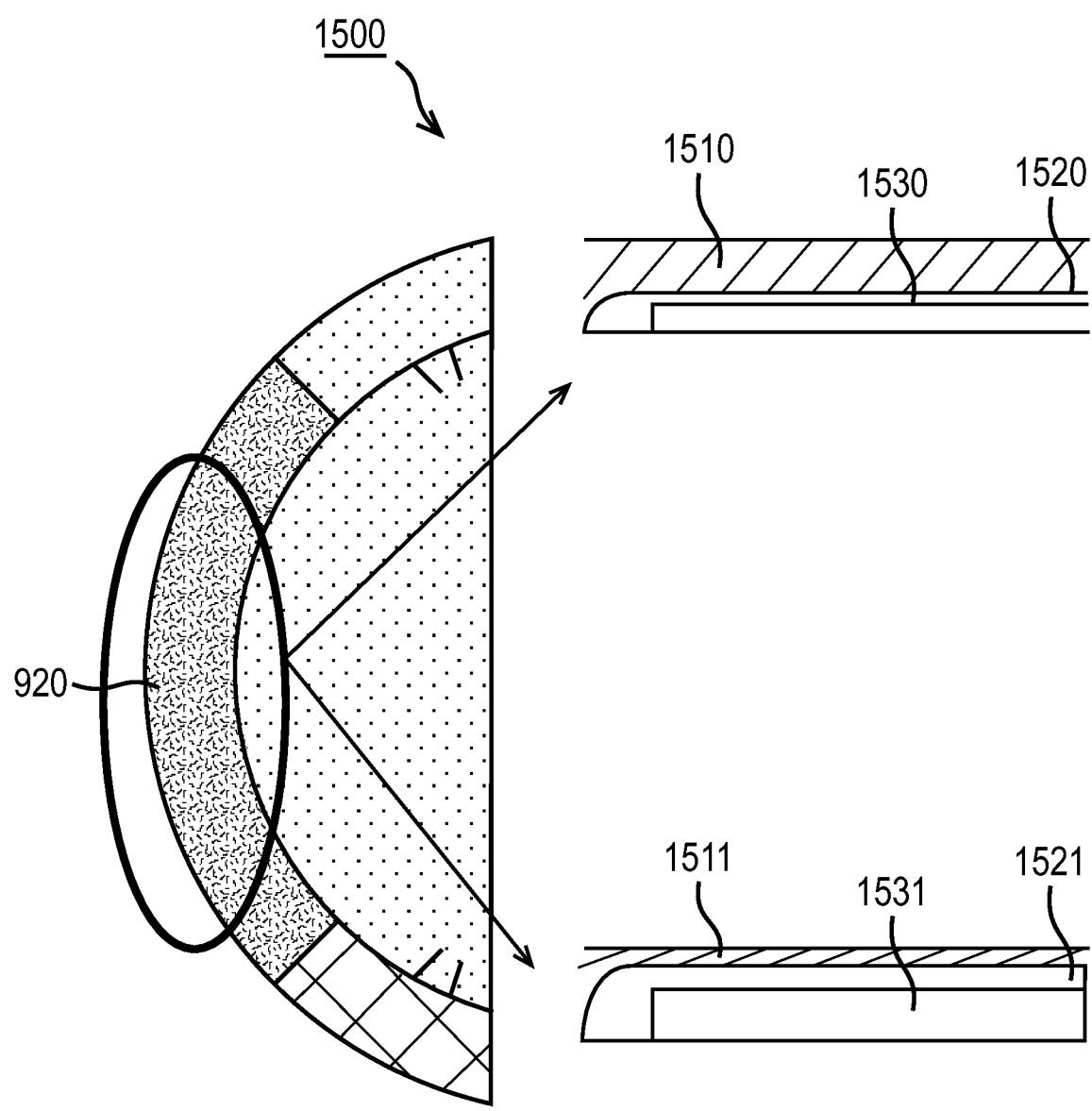
FIG. 15 illustrates an exemplary type of electroactive pumping mechanism.

Yet another type of electroactive pumping mechanism is depicted in FIG. 15, item 1500. In this type of mechanism, at least a portion of the region 920 shown on FIG. 15, is made up of a membrane or material made up of an electroactive polymer. In some mechanisms, the electroactive polymer material 1530 may be made to expand upon the application of an electropotential as shown by the new shape 1531. This will cause a membrane layer 1520 to move to a different location, for example as depicted at 1521. The volume of the fluid containing space 1510 may then be lowered as is apparent from the cross sectional size of 1511. For ease of explanation, the deformation has been described as a simple distortion of the material to fill the vertical space in a cross section. Another example can be where the membrane layer 1520, 1521 may be caused to move by a twisting or bowing deformation that may occur to the electroactive polymer layer upon application of an electrical potential change. The effect on the membrane layer and the change in volume of the storage region may be similar or equivalent in such an example.

When the expansion is made to occur, this may cause a second type of fluid to flow into the optically active cavity of the lens device and in so doing force a first fluid out of the cavity and into the second storage location 920. If this region is formed to have a surface that is repellant to the fluid of the second type then the pressure of the expanding electroactive polymer material 1530, 1531 on the membrane 1520, 1521 may force the first fluid to occupy the storage location none the less. When the distortion of the membrane 1520, 1521 is made to reverse (i.e., return to an undistorted state), then the fluids may be forced to flow back to the initial configuration.

It will be apparent to one skilled in the art that another type of two state lenses may result from the use of two regions, 920, where both regions have a similar electroactive combination of electroactive material 1530, 1531 and membrane 1520, 1521. If the two regions are made to act in an opposite manner from each other, a similar switching of active fluid type can be made to occur. It may additionally be apparent that many different lenses may be formed by the combination of devices of this type and coatings that interact with two different fluids or a single fluid configured with a gaseous or evacuated second fluid equivalent. These two fluids or the fluid and the non-fluid state may have the change in index of refraction effect previously mentioned or the filtering role as well. It is described herein that many different lenses may be formed by the combination of the devices described above and coatings that interact with two different fluids or a single fluid configured with a gaseous or evacuated second fluid equivalent. Non-limiting examples of gaseous fluids comprise one or more of Argon, Nitrogen, Oxygen, Helium, and Neon. Additionally, combinations of such gaseous fluids comprise, as a non-limiting example, a gas combination including Nitrogen, Oxygen and optionally other gases. Other gases that may be found in the ambient may be acceptable for the gas phase.

Electroactive polymer and electroactive polymer materials are described herein and non-limiting examples of such electroactive polymer and electroactive polymer materials include one or more of films comprising polyvinylidene fluoride, electroactive hydrogel films based on poly(acrylic acid) or polypyrrole, and films comprising electrode coupled carbon nanotubes.

Dielectric films and dielectrics are described herein. By way of non-limiting examples, the dielectric film or dielectrics used in the discretely variable optic portion possess characteristics appropriate to the invention described herein. A dielectric may comprise one or more material layers functioning alone or together as a dielectric. Multiple layers may be used to achieve dielectric performance superior to that of a single dielectric.

The dielectric may permit a defect-free insulating layer at a thickness desired for the discretely variable optic portion, for example, between about 0.1 and 10 µm. A defect may refer to a pinhole, as is known by those skilled in the art to be a hole in the dielectric permitting electrical and/or chemical contact through the dielectric. The dielectric, at a given thickness, may meet requirements for breakdown voltage, for example, the dielectric should withstand 100 volts or more.

The dielectric may allow for fabrication onto curved, conical, spherical, and complex three-dimensional surfaces (e.g., curved surfaces or non-planar surfaces). Typical methods of dip- and spin-coating may be used, or other methods may be employed.

The dielectric may resist damage from chemicals in the variable optic portion, for example salines, oils, solvents, acid, and bases. The dielectric may resist damage from infrared, ultraviolet, and visible light. Undesirable damage may include degradation to parameters described herein, for example surface energy and optical transmission. The dielectric may resist permeation of ions. The dielectric may have surface energy within a specified range to function with liquids in an electrowetting system. The dielectric may adhere to an underlying electrode and/or substrate, for example, with the use of an adhesion promotion layer. The dielectric may be fabricated using a process which allows for low contamination, low surface defects, conformal coating, and low surface roughness.

The dielectric may possess relative permittivity or a dielectric constant which is compatible with electrical operation of the system. For example, a low relative permittivity, such as between about 2.0 and 3.0 which is typical of some insulating polymers, may be used as a suitable compromise between reducing capacitance for a given electrode area and lowering the activation voltage for electrowetting. A dielectric with a higher or lower relative permittivity may be used, with a corresponding change in capacitance and activation voltage.

The dielectric may possess a high resistivity, for example greater than $10^{16}$ ohm meters, thereby permitting a very small current to flow even with a high applied voltage. Once realized on an electrode, the resistance through the dielectric may be much more than 1 giga ohm, for example about 100 giga ohms. Such a resistance would typically allow only 500 pA of current to flow with 50V applied across the dielectric.

The dielectric may possess qualities desired for an optic device, for example high transmission (>99%), low coloration, and low haze in the visible spectrum, low dispersion (Abbe number 34 to 57), and refractive index within a certain range (1.4 to 1.7).

Example, non-limiting, dielectric materials, include one or more of Parylene-C, Parylene-HT, Silicon Dioxide, Silicon Nitride, and Teflon AF.

Electrodes or pads are described herein for applying an electric potential for achieving an electrowetting, dielectric, effect. An electrode generally comprises one or more material layers functioning alone or together as an electrode.

The electrode may adhere to an underlying substrate, dielectric coating, or other objects in the system, perhaps with the use of an adhesion promoter (e.g., methacryloxypropyltrimethoxysilane). The electrode may form a beneficial native oxide or be processed to create a beneficial oxide layer. The electrode may be transparent, substantially transparent or opaque, with high optical transmission and little reflection. The electrode may be patterned or etched with known processing methods. For example, the electrodes may be evaporated, sputtered, or electroplated, using photolithographic patterning and/or lift-off processes.

The electrode may be designed to have suitable conductivity for use in the electrical system described herein, for example, meeting the requirements for resistance in a given geometric construct. An example gold electrode may have resistivity of about $2.44 \times 10^{-8}$ ohm meters with a resulting electrode resistance much less than about 1 ohm. Much higher electrode resistance may be tolerated, for example megaohms or even gigaohm, if such a resistance permits sufficient current flow to charge the capacitance in the system.

The electrodes or pads may be manufactured from one or more of indium tin oxide (ITO), gold, stainless steel, chrome, and aluminum. It will be appreciated that this is not an exhaustive list.

The discretely variable optic portion may be controlled by an applied voltage, for example, a voltage may be applied to the electrodes described herein creating an electric field across the dielectric also described herein. The voltage may be applied via components 790, 890, 1290 1360 and 1340 illustrated in FIGS. 7, 8, 12, and 13 respectively. In one example, a direct-current (DC) bias may be applied. The voltage used to produce the desired optical response depends on several parameters. For example, in one example 50 volts may be required to achieve a 2-diopter change in optical power given the relative permittivity and thickness of the dielectric. In an alternative example, 20 volts may be required to achieve a 2-diopter change in optical power, with an assumed change in the relative permittivity and thickness of the dielectric. Therefore, typical voltages used in the system may be 20 to 50 volts, but could include a much wider range of integer values voltage values from 1 volt to more than 100 volts.

In one example, an alternating-current (AC) may be applied. AC pulsing and other waveforms may be used to drive the electrodes. As may be appreciated by one skilled in the art, the driving waveform may be associated with optical response time, current consumption, fluid dynamics, dielectric breakdown, and other effects. Similar voltage values described with regard to the DC biased may be used for the AC pulsing.

The second fluid is described herein as being optionally an oil-like fluid, and may include a non-polar fluid mixture or a solvent-like fluid. Oil may be useful in electrowetting ophthalmic devices. The oil or oil-like fluid may comprise more than one component, i.e. a mixture of oil components. The oil or oil-like fluid may have a low viscosity, e.g. less than 2 mPa s at 25 degrees C., preferably 1 mPa s or lower at 25 degrees C. The oil or oil-like fluid may have a low polarity, meaning it does not substantially comprise polar components or contaminants. Furthermore, this means the oil or oil-like fluid does not appreciably contain trace amounts of dissolved water, which is preferable for DC mode electrowetting. For AC mode electrowetting, the requirement is somewhat less stringent.

The oil or oil-like fluid may provide the ability to wet the electrowetting dielectric (in the surrounding of the saline phase) with a very low oil-dielectric contact angle, for example 10 degrees or less. Improved wetting (i.e. a lower contact angle) may result in less contact angle hysteresis and more predictable or reliable performance.

The oil or oil-like fluid may have a refractive index substantially different from the saline used in the device, for example a difference of 0.010 (no units) or more in refractive index. The relevant wavelength of the refractive index difference described is that of the sodium D line at 589.29 nm (i.e. "n_sub_D"). Preferably, the oil has a higher refractive index than the saline.

The oil or oil-like fluid may have a specific gravity substantially the same as the saline phase. For example, the specific gravity difference may be 0.003 (no units), or preferably less. The specific gravity may be modified by selection and mixture of dense and less dense oil components. Preferred oil formulations have a specific gravity slightly greater than 1.00.

The components of the oil or oil-like fluid are generally biocompatible and preferred oils are mild ocular irritants or are non-irritants. The oil or oil-like fluid may optionally contain additives if the additives do not substantially adversely affect the performance of the device. Specific additives may comprise: dyes, UV blockers, hindered amine light stabilizers, anti-microbial agents, anti-oxidants, rheology modifiers, surfactants, diluents, freezing point depressants, or the like.

Some, preferred, non-limiting example oil formulations are as follows:

Example 1

Phenyltrimethyl Germane 48.0% (w/w), SIP.6827 (Gelest) 51.5%, and 1-pentanol 0.5%; and Example 2

1-Bromopentane 52.4% (w/w) and Decamethyltetrasiloxane 47.6% (w/w)

Saline is described herein. The saline may assist in electrowetting ophthalmic devices. The saline may comprise more than one component, e.g., a mixture of components. The primary component of the saline is preferably purified (i.e., deionized and reverse osmosis) water. A secondary component of the saline is an ionisable component that may impart improved conductivity, for example, an inorganic salt.

The saline may have a low viscosity, e.g. less than 2 mPa s at 25 degrees C., preferably 1 mPa s or lower at 25 degrees C. The saline may have a high purity, which means that the saline does not appreciably contain polar components that could migrate to the oil phase. This may be important for the DC operating mode electrowetting. For AC mode electrowetting, the requirement that the saline has a high purity is somewhat less stringent.

The saline may have a refractive index substantially different from the other fluid used in the device, for example, a difference of 0.010 (no units) or more in refractive index. The relevant wavelength of the refractive index difference described is that of the sodium D line at 589.29 nm (i.e. "n_sub_D"). Preferably, the saline has a lower refractive index than oily fluid if it is used.

The saline may have a specific gravity substantially the same as an oil phase described herein. For example, the specific gravity difference may be 0.003 (no units), or preferably less. The specific gravity may be modified by careful selection and mixture of water and ionic components. Preferred saline formulations have a specific gravity slightly greater than 1.00.

The components of the saline should preferably be as biocompatible as possible. A preferred saline is a mild ocular irritant or a non-irritant. A preferred saline has an osmolality approximately equal to that of human tears, for example, 300-500 mOsm/kg. Furthermore, the saline may optionally contain additives if the additives do not substantially adversely affect the performance of the device. Specific additives may comprise: dyes, UV blockers, hindered amine light stabilizers, anti-microbial agents, anti-oxidants, rheology modifiers, surfactants, diluents, freezing point depressants, or the like.

Some, preferred, non-limiting example saline formulations are as follows:

Example 1

Potassium Chloride 0.1% (w/w), and Deionized Water 99.9%

Example 2

Calcium Chloride 1.0% (w/w), Deionized Water 98.5%, and 1-pentanol 0.5%; and

Example 3

Sodium Chloride 0.9% (w/w), and Deionized Water 99.1%

This invention relates to methods and apparatus for providing a variable optic insert for an ophthalmic lens. More specifically, where an energy source is capable of powering the variable optic insert included within the ophthalmic lens. In some embodiments, an ophthalmic lens is cast molded from a silicone hydrogel.

Various aspects and examples of the present invention are set out in the following non-exhaustive list of numbered clauses:

Clause 1: A variable focus ophthalmic device comprising:
a front curve optical portion of the variable focus ophthalmic device comprising a front curve top optical surface and a front curve bottom optical surface;
a back curve optical portion of the variable focus ophthalmic device comprising a back curve top optical surface and a back curve bottom optical surface;
a cavity formed by the front curve bottom optical surface of the front curve optical portion of the variable focus ophthalmic device and the back curve top optical surface of the back curve portion of the variable focus ophthalmic device;
a dielectric film in contact with at least a portion of one or more fluids and overlying an electrode capable of withstanding an electric field;
a first fluid with a first index of refraction and a second fluid with a second index of refraction, wherein the first index of refraction and the second index of refraction are different and the two fluids are immiscible; and
one or more reservoir regions for containment of a volume of fluid equal or approximately equal to the volume of the first fluid and wherein the reservoir is in fluid connection with said formed cavity.

Clause 2: The variable focus ophthalmic device of Clause 1, additionally comprising an energy source in electrical communication with said electrode, wherein said energy source may provide an electric current capable of withstanding the electric field.

Clause 3: The variable focus ophthalmic device of Clause 1, wherein the dielectric film overlays more than one electrode.

Clause 4: The variable focus ophthalmic device of Clause 1, wherein the fluid connection between the reservoir and the formed cavity is via one or more channels that allow for the flow of the first and second fluids.

Clause 5: The variable focus ophthalmic device of Clause 4, additionally comprising a fluid control valve to control the flow of one or both the first and second fluids.

Clause 6: The variable focus ophthalmic device of Clause 4, wherein the fluid control device comprises one or more check valves.

Clause 7: The variable focus ophthalmic device of Clause 4, wherein the fluid control device comprises one or more microelectromechanical valve.

Clause 8: The variable focus ophthalmic device of Clause 1, wherein the volume of the reservoir and the volume of the formed cavity is generally equal.

Clause 9: The variable focus ophthalmic device of Clause 1, wherein the electrode and dielectric film is located on at least a portion of one or both of; the surfaces forming the cavity and the reservoir.

Clause 10: The variable focus ophthalmic device of Clause 4, wherein the dielectric film is located on at least a portion of one or more of; the one or more channels between the cavity and the reservoir, the surfaces forming the cavity and the reservoir.

Clause 11: The variable focus ophthalmic device of Clause 1, wherein one or both the first or second fluid additionally comprise a light absorbing dye component.

Clause 12: The variable focus ophthalmic device of Clause 1, wherein one or both the first or second fluid additionally comprise a light shading dye component.

Clause 13: The variable focus ophthalmic device of Clause 1, wherein one or both the first or second fluid additionally comprise a component with enantiomeric characteristics.

Clause 14: The variable focus ophthalmic device of Clause 1, additionally comprising an encapsulating ophthalmic lens.

Clause 15: The variable focus ophthalmic device of Clause 14, wherein the encapsulating ophthalmic lens is made up of a biocompatible hydrogel.

Clause 16: The variable focus ophthalmic device of Clause 1, wherein the bottom optical surface of the back curve element is positioned on the front curve portion of an ophthalmic lens.

Clause 17: The variable focus ophthalmic device of Clause 1, wherein the top optical surface of the back curve element is positioned on the back curve portion of an ophthalmic lens.

Clause 18: The variable focus ophthalmic device of Clause 4, wherein one or more of the reservoir, the cavity formed or the channels can be formed by a generally deformable material that varies its shape under the influence of an electric current.

Clause 19: The variable focus ophthalmic device of Clause 4, wherein one or more of the reservoir, the cavity formed or the channels can be formed by a generally deformable material that varies its shape under the influence of an electric field.

Clause 20: The variable focus ophthalmic device of Clause 18, wherein at least a portion of said deformable material capable of varying its shape under the influence of an electric current comprises an electroactive polymer material.

The invention claimed is:

1. A variable focus ophthalmic device comprising:
a front curve optical portion comprising a front curve top optical surface and a front curve bottom optical surface;
a back curve optical portion comprising a back curve top optical surface and a back curve bottom optical surface;
a cavity formed by the front curve bottom optical surface of the front curve optical portion and the back curve top optical surface of the back curve optical portion;
a first liquid with a first index of refraction and a second liquid with a second index of refraction, wherein the first index of refraction is different than the second index of refraction and the first liquid and the second liquid are immiscible;
one or more electrodes configured to establish an electric field;
a dielectric film in contact with at least a portion of one or more of the first liquid and the second liquid and overlying at least one of the electrodes;
at least one reservoir for containing a volume of the first liquid or the second liquid in fluid connection with said cavity; and
one or more channels between the reservoir and the cavity;
wherein the cavity and reservoir are configured such that when the first liquid occupies the cavity, the second liquid is excluded from the cavity.

2. The variable focus ophthalmic device of claim 1, additionally comprising an energy source in electrical communication with said electrode.

3. The variable focus ophthalmic device of claim 1, wherein the dielectric film overlays at least two of the electrodes.

4. The variable focus ophthalmic device of claim 1, additionally comprising a fluid control device to control the flow of one or both of the first liquid and second liquid.

5. The variable focus ophthalmic device of claim 4, wherein the fluid control device comprises one or more check valves.

6. The variable focus ophthalmic device of claim 4, wherein the fluid control device comprises one or more microelectromechanical valves.

7. The variable focus ophthalmic device of claim 1, wherein the reservoir and the cavity are of generally equal volume.

8. The variable focus ophthalmic device of claim 1, wherein the electrode and the dielectric film are located on at least a portion of one or both of the cavity and the reservoir.

9. The variable focus ophthalmic device of claim 1, wherein the dielectric film is located on at least a portion of one or more of the channels, the cavity and the reservoir.

10. The variable focus ophthalmic device of claim 1, wherein at least one of the first liquid and the second liquid comprises a light absorbing dye component.

11. The variable focus ophthalmic device of claim 1, wherein at least one of the first liquid and the second liquid comprises a light shading dye component.

12. The variable focus ophthalmic device of claim 1, wherein at least one of the first liquid and second liquid comprises a component with enantiomeric characteristics.

13. The variable focus ophthalmic device of claim 1, additionally comprising an encapsulating ophthalmic lens.

14. The variable focus ophthalmic device of claim 13, wherein the encapsulating ophthalmic lens is made up of a biocompatible hydrogel.

15. The variable focus ophthalmic device of claim 1, wherein one or more of the reservoir, the cavity and the channels comprise a generally deformable material that varies its shape under the influence of an electric current.

16. The variable focus ophthalmic device of claim 15, wherein at least a portion of said deformable material comprises an electroactive polymer material.

17. The variable focus ophthalmic device of claim 1, wherein one or more of the reservoir, the cavity and the channels comprise a generally deformable material that varies its shape under the influence of the electric field.

18. The variable focus ophthalmic device of claim 1, additionally comprising an ophthalmic lens.

19. The variable focus ophthalmic device of claim 18, wherein the back curve bottom optical surface is positioned on the front surface of the ophthalmic lens.

20. The variable focus ophthalmic device of claim 18, wherein the front curve top optical surface is positioned on the back surface of the ophthalmic lens.

21. The variable focus ophthalmic device of claim 1, further comprising a first reservoir for containing a volume of the first liquid in fluid connection with said cavity and a second reservoir for containing a volume of the second liquid in fluid connection with said cavity.

* * * * *